United States Patent [19]

Noguchi et al.

[11] 4,085,713
[45] Apr. 25, 1978

[54] TORCH IGNITION INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 701,863

[22] Filed: Jul. 1, 1976

Related U.S. Application Data

[63] Continuation-in-part of Ser. No. 445,785, Feb. 25, 1974, Pat. No. 3,982,504.

[30] Foreign Application Priority Data

Feb. 27, 1973 Japan .................................. 48-23926
Nov. 6, 1973 Japan ................................ 48-124663
Nov. 13, 1973 Japan ................................ 48-127952
Nov. 23, 1973 Japan ................................ 48-131836
Jul. 4, 1975 Japan .................................. 50-83048
Aug. 9, 1975 Japan .................................. 50-96773

[51] Int. Cl.² ............................................ F02B 23/00
[52] U.S. Cl. ............................. 123/75 B; 123/191 SP; 123/32 ST
[58] Field of Search .......... 123/191 SP, 191 S, 32 SP, 123/32 ST, 75 B

[56] References Cited

U.S. PATENT DOCUMENTS 3,974,818 8/1976 Noguchi et al. .................. 123/32 SP
3,982,504 9/1976 Noguchi et al. .................. 123/32 SP

*Primary Examiner*—Ronald H. Lazarus
*Attorney, Agent, or Firm*—Cushman, Darby & Cushman

[57] ABSTRACT

A torch ignition internal combustion engine has a main combustion chamber for the combustion of a lean air-fuel mixture and an auxiliary combustion chamber for the combustion of a rich air-fuel mixture. The auxiliary combustion chamber has a suction and a discharge apertures open to the main combustion chamber. The suction aperture is located near to a valve seat for an intake valve so that the auxiliary combustion chamber is communicated with an intake port through the suction aperture and a part of the main combustion chamber when the intake valve is opened. The intake port is connected at its upstream end to an air intake pipe. A fuel injection nozzle extends into the intake port and is positioned such that a straight line between a fuel discharge orifice of the nozzle and a point of the valve seat nearest to the suction aperture is included in the jet of fuel discharged from the nozzle, so that a substantial part of the fuel injection from the nozzle during an intake stroke is directed toward the suction aperture of the auxiliary combustion chamber to thereby facilitate introduction of the rich air-fuel mixture thereinto. The fuel is discharged from the nozzle continuously throughout all of the strokes of each cycle of engine operation, so that the fuel discharged during the strokes except the intake stroke is retained and properly vaporized within the intake port and mixed with air to produce an air-fuel mixture which is introduced into the main combustion chamber together with fresh air from the air intake pipe forming a lean air-fuel mixture when the intake valve is opened, whereby an improved stratified charge is provided.

6 Claims, 26 Drawing Figures

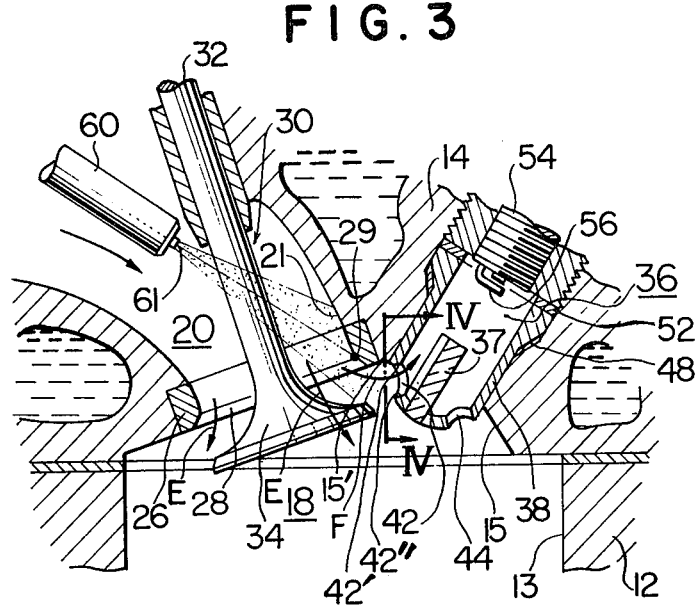

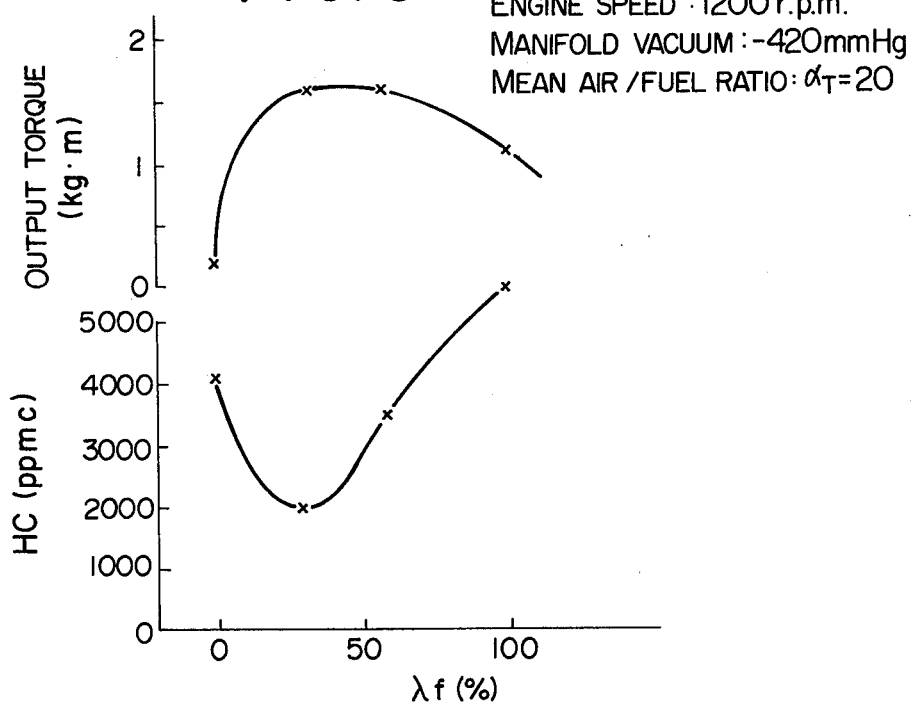
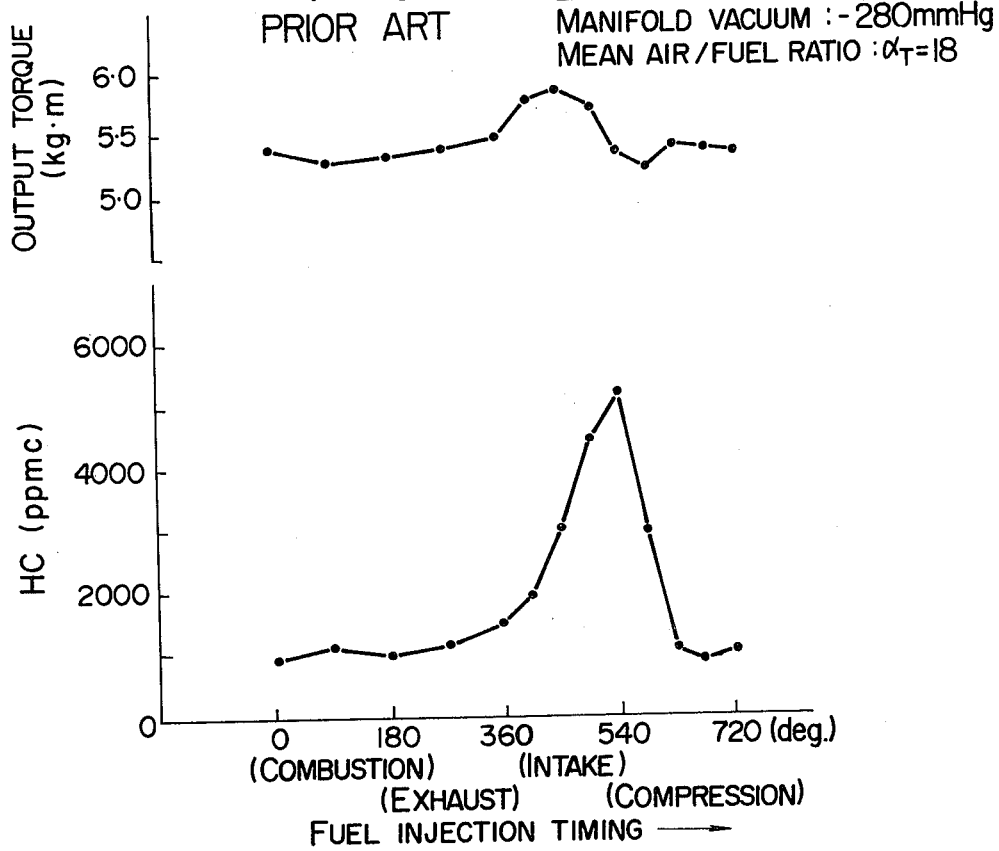

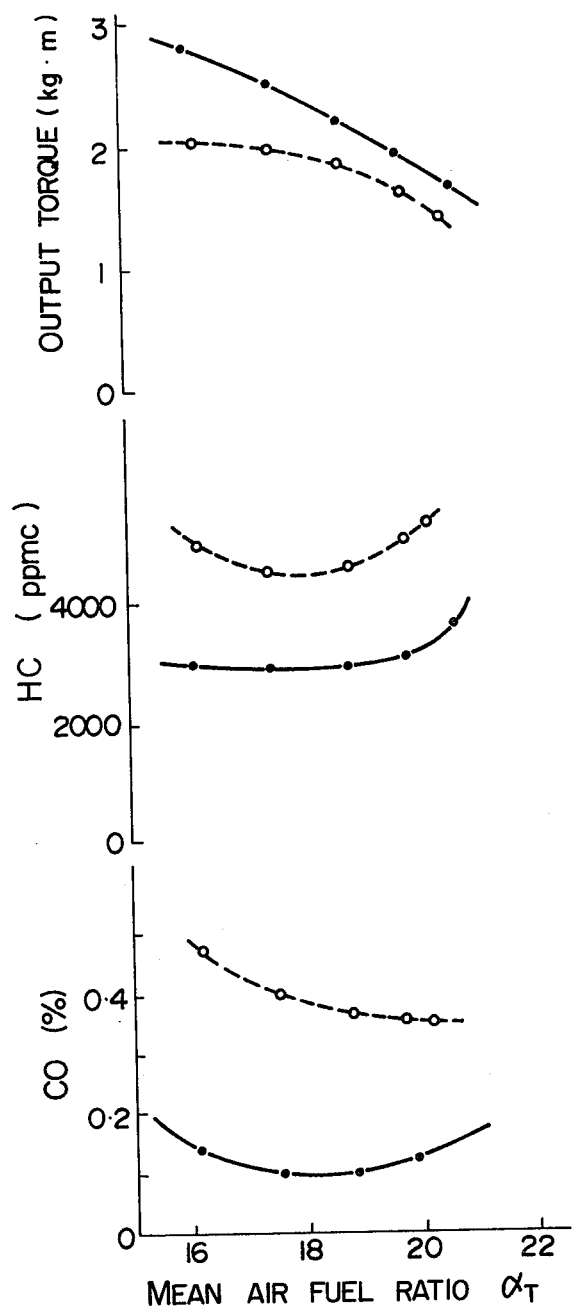

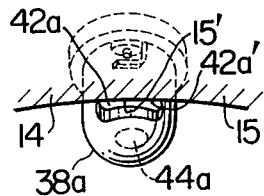
FIG. 15
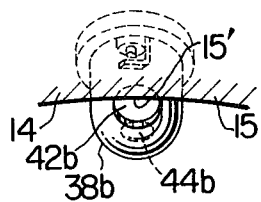
FIG. 16
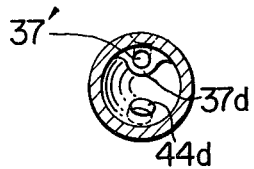
FIG. 18B
FIG. 17
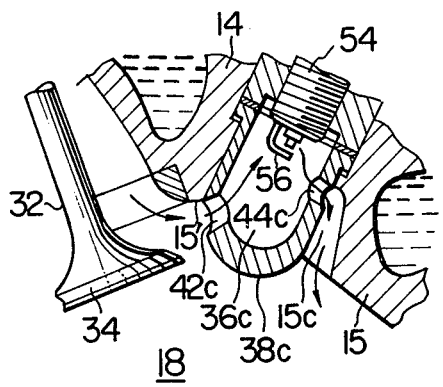
FIG. 18A
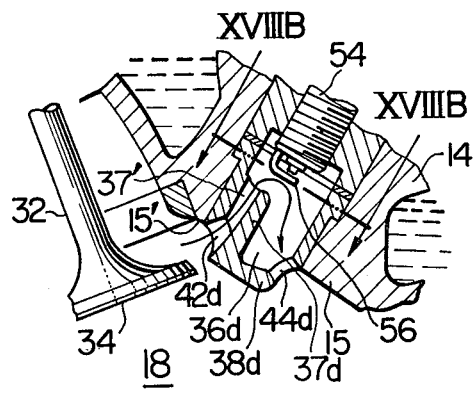
FIG. 19
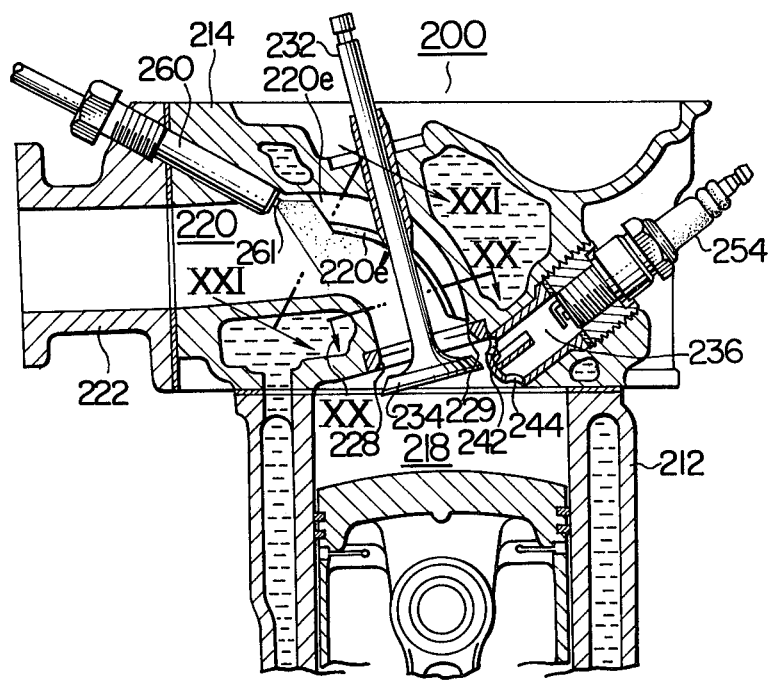

TORCH IGNITION INTERNAL COMBUSTION ENGINE

CROSS-REFERENCE TO RELATED APPLICATION

This application is a continuation in part of applicants' prior copending application, Ser. No. 445,785, filed Feb. 25, 1974 now U.S. Pat. No. 3,982,504.

BACKGROUND OF THE INVENTION

1. Field of the Invention

The present invention relates generally to an internal combustion engine intended to reduce harmful components of engine exhaust gases and, more particularly, to a torch ignition type internal combustion engine having main and auxiliary combustion chambers, in which a lean air-fuel mixture in the main combustion chamber is ignited by a torch or torches produced by the combustion of a rich air-fuel mixture in the auxiliary combustion chamber adjacent to electrodes of a spark or ignition plug.

2. Description of the Prior Art

In the applicants' prior copending application referred to above, there is disclosed a torch ignition internal combustion engine which comprises a cylinder, a piston, a cylinder head cooperating with the cylinder and the piston to define a main combustion chamber for the combustion of a lean air-fuel mixture, an intake port for introducing principally air or a lean air-fuel mixture to the main combustion chamber, an intake valve movably positioned with respect to the intake port, and an auxiliary combustion chamber formed of a pot-shaped cavity having at least one suction aperture through which a rich air-fuel mixture is supplied to the auxiliary combustion chamber when the intake valve is opened. The cavity also has at least one discharge aperture. The auxiliary combustion chamber is always communicated through the suction and discharge apertures with the main combustion chamber during the time when the intake valve is closed. The auxiliary combustion chamber is adapted to be communicated with the intake port through the suction aperture and through a part of the main combustion chamber when the intake valve is opened. A spark plug has a set of electrodes exposed to the auxiliary combustion chamber. The engine is also provided with means for introducing the rich air-fuel mixture into the auxiliary combustion chamber through the suction aperture when the intake valve is opened. The introducing means includes a fuel injection nozzle provided upstream of the intake valve for discharging a fuel at a pressure higher than the atmospheric pressure. The fuel and air in the intake port form the rich air-fuel mixture which, when the intake valve is opened, is introduced through the suction aperture into the auxiliary combustion chamber. When the rich air-fuel mixture is ignited in the auxiliary combustion chamber by the spark plug, torch jets run through the suction and discharge apertures into the main combustion chamber to ignite the lean air-fuel mixture therein.

Compared with the use of carburetors in this type of internal combustion engines, the use of fuel injection nozzles is advantageous in that a fuel can be more uniformly supplied to respective engine cylinders and in that quick response can be obtained at a transition point of engine operation, for example, at acceleration, deceleration or the like.

Through extensive researches, the inventors have found that the fuel injection timing greately influences the formation of a stratified charge of fuel in an engine cylinder, the torch ignition of the fuel charge therein and the engine performance. The term "fuel injection timing" used herein means a timing when the fuel injection ceases. In order to effectively form a stratified charge of fuel in an engine cylinder, it is indispensable that a quantity of fuel is discharged from an injection nozzle in an intake stroke of the engine. However, because a charge of fuel injected from the nozzle during the intake stroke is not easily atomized, the injection of fuel during the intake stroke gives rise to a poor combustion of the fuel with a resultant increase in the unburnt components of the engine exhaust gases. The injection of the fuel during the intake stroke is also liable to cause a part of the injected fuel to enter the auxiliary combustion chamber while the fuel is still in the form of droplets which tend to cause the plug electrodes to get wet with the fuel droplets with resultant misfire and inoperability of the engine. On the other hand, the injection of the fuel from the nozzle during the time when the intake valve is closed affords the injected fuel a sufficient time for atomization by the time the intake valve is opened. In this case, however, the atomized fuel is diffused into the air or the air-fuel mixture in the intake port and diluted thereby, making it impossible for the auxiliary combustion chamber to receive a charge of an air-fuel mixture rich enough for spark ignition.

SUMMARY OF THE INVENTION

It is an object of the present invention to provide an improved torch ignition internal combustion engine in which an engine cylinder can be supplied with a properly stratified charge of a mixture of air and a fuel discharged from a fuel injection nozzle.

It is another object of the present invention to provide an improved method of operating a torch ignition internal combustion engine.

In the torch ignition internal combustion engine according to the present invention, a fuel injection nozzle is supplied with a fuel continuously throughout all of the strokes of each cycle of engine operation. The fuel injection nozzle has a discharge orifice disposed within an intake port such that the fuel discharged by the fuel injection nozzle during an intake stroke of each cycle of engine operation is moved through the intake port and through a part of a main combustion chamber toward a suction aperture of an auxiliary combustion chamber formed of a pot-shaped cavity. According to the method of the present invention, the amount of the fuel discharged during an intake stroke is substantially equal to a quarter of a charge of the fuel to be fed to each engine cylinder during each cycle of engine operation. The rest of the fuel charge, which is substantially equal to three quarters of the fuel charge, is discharged from the injection nozzle into the intake port during the time when the intake valve is closed whereby the rest of the fuel charge in the intake port is effectively vaporized in the intake port and mixed with air therein to produce an air-fuel mixture. The effectively vaporized air-fuel mixture is then introduced into the main combustion chamber together with fresh air from an air intake pipe to form therewith a lean air-fuel mixture when the intake valve is opened. Preferably, a charge of fuel may be discharged from the nozzle continuously throughout all of the strokes of each cycle of engine operation. In an embodiment of the internal combustion engine according to the present invention, the discharge orifice of the fuel injection nozzle is positioned within the intake port such that a jet of the fuel injected from the nozzle includes therein a straight line extending between the discharge orifice and a point of a valve seat adjacent to the suction aperture of the auxiliary combustion chamber, whereby a rich air-fuel mixture formed by the fuel discharged during the intake stroke and air in the intake port is caused to flow along the straight line and toward the suction aperture of the auxiliary combustion chamber. In other embodiments of the internal combustion engine according to the present invention, a substantially separated passage is provided in the intake port and extends axially along the inner surface thereof in the direction toward the suction aperture of the auxiliary combustion chamber to receive at least a part of the jet discharged from the injection nozzle, whereby the part of the fuel charge received in the separated passage during the intake stroke is mixed with air in the intake port during the flow of the fuel through the passage to produce a rich air-fuel mixture which is fed toward the suction aperture of the auxiliary combustion chamber. The separated passage prevents the rich air-fuel mixture from being disturbed by the circumferential flow of the air or the previously formed air-fuel mixture in the intake port during the intake stroke. The rest of the fuel charge discharged during the strokes of each cycle of engine operation other than the intake stroke is retained in the intake port for vaporization therein as in the first embodiment.

The above and other objects, features and advantages of the present invention will be made more apparent by the following description with reference to the accompanying drawings.

BRIEF DESCRIPTION OF DRAWINGS

FIG. 3 is an enlarged fragmentary sectional view of a part of the engine shown in FIG. 1;

FIG. 4 is a sectional view taken along line IV—IV in FIG. 3;

FIG. 5 is a partly diagrammatic and partly sectional view illustrating details of a throttle device and fuel pumping and metering means;

FIG. 8 is a graphical illustration of the results of tests on the engine of the first embodiment of the invention concerning the relationships between $\lambda f$ (ratio of an amount of fuel discharged during an intake stroke relative to a total amount of fuel to be discharged in one complete cycle of engine operation) and the output torque and between $\lambda f$ and HC (hydrocarbon) emission;

FIG. 9 is a graphical illustration of the results of tests on a prior art torch ignition internal combustion engine concerning the relationships between the fuel injection timing and the output torque and between the fuel injection timing and HC emission;

FIG. 10 graphically illustrates the comparison between the results of tests on the engine of the present invention and on the prior art engine concerning the relationships between the mean air-fuel ratio and the output torque, between the mean air-fuel ratio and HC emission and between the mean air-fuel ratio and CO (carbon monoxide) emission;

FIGS. 15 and 16 are views similar to FIG. 4 but illustrate first and second modifications of the auxiliary combustion chamber;

FIGS. 17 and 18A are fragmentary sectional views of a part of the engine according to the present invention illustrating third and fourth modifications of the auxiliary combustion chamber;

FIG. 18B is a section taken along line XVIIIB—XVIIIB in FIG. 18A;

FIG. 19 is a sectional front elevation of a part of a second embodiment of the torch ignition internal combustion engine according to the present invention;

DESCRIPTION OF PREFERRED EMBODIMENTS

Figure 1:
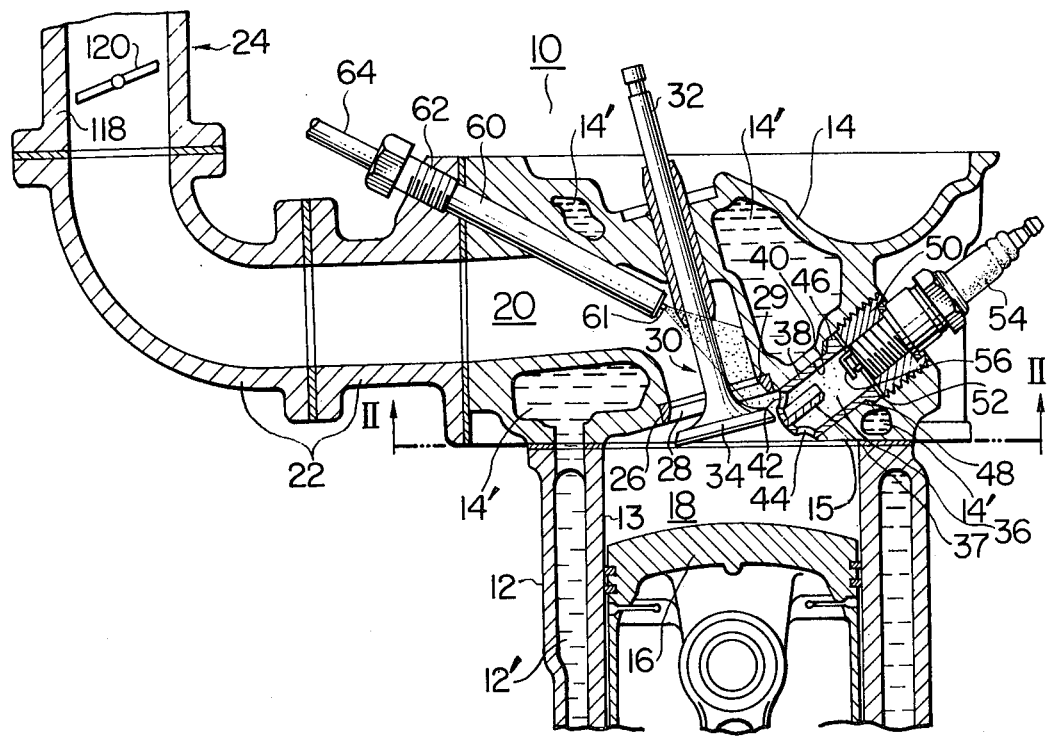
FIG. 1 is a sectional front elevation of a part of a first embodiment of a torch ignition internal combustion engine according to the present invention.
Figure 2:
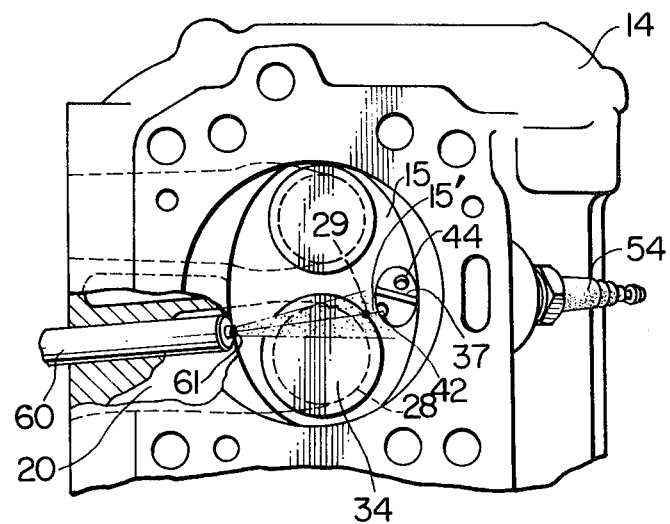
FIG. 2 is a bottom view of a cylinder head of the engine shown in FIG. 1 as viewed from line II—II in FIG. 1 with a part of the cylinder head being cut away to show a fuel injection nozzle.

Referring to FIGS. 1 to 6A, a first embodiment of the internal combustion engine according to the present invention is generally designated by 10 and includes a cylinder 12 and a cylinder head 14 mounted on the top of the cylinder 12. The cylinder 12 defines therein a cylinder bore 13 in which a piston 16 is mounted for reciprocal motion therein. The top face of the piston 16, the cylinder bore 13 and the bottom or inner face 15 of the cylinder head 14 cooperate to define a main combustion chamber 18 for the combustion of a lean mixture of air and a fuel to be discussed later in more detail. Passages 12' and 14' for engine cooling water are provided in the cylinder 12 and the cylinder head 14, respectively.

The cylinder head 14 defines therein an intake port 20 having a downstream end connected to the main combustion chamber 18. The other or upstream end of the intake port 20 is connected with an intake manifold 22 which in turn is connected at is upstream end with a throttle device 24 the details of which will be described later. An upstream end of the throttle device 24 communicates with the atmosphere through an air intake pipe.

At the downstream end of the intake port 20, a valve-seat insert 26 is secured to the cylinder head 14 to provide an annular valve seat 28 for an intake valve 30 having a valve stem 32 and a valve head 34. The intake valve 30 is axially slidably mounted on the cylinder head 14 and adapted to be reciprocated by a conventional well-known mechanism (not shown) so that the valve head 34 is moved into and out of sealing engagement with the valve seat 28 to control the communication between the intake port 20 and the main combustion chamber 18.

An auxiliary combustion chamber 36, which is termed herein "trap chamber", is defined by a pot-shaped member 38 received in and extending through a hole 40 formed in the cylinder head 14. The pot-shaped member 38 has a substantially closed hemispherical inner end which protrudes from the cylinder head 14 into the main combustion chamber 18 and in which a suction and a discharge apertures 42 and 44 are formed. The pot-shaped member 38 is provided at its outer end with an annular flange 46. The outer peripheral surface of the flange 46 is connected to a cylindrical outer peripheral surface of the intermediate portion of the member 38 by an inwardly converging tapered surface. The hole 40 in the cylinder head 14 is enlarged at a point adjacent to the flange 46 to provide an outwardly diverging tapered surface. A sealing washer 48 is provided between the tapered surfaces of the pot-shaped member 38 and of the hole 40. An ignition plug mounting member 50 having an internal screw thread is screwed into the outer part of the hole 40 to urge the flange 46 of the pot-shaped member 38 into sealing engagement with the sealing washer 48. A second sealing washer 52 is interposed between the pot-shaped member 38 and the plug mounting member 50. An ignition plug 54 is screwed into the plug mounting member 50 to a position in which a set of electrodes 56 of the plug 54 is exposed to the trap chamber 36.

The pot-shaped member 38 is positioned in the cylinder head 14 such that a part of the outer periphery of the protruding hemispherical end of the pot-shaped member 38 is located near to the valve seat 28. The suction and discharge apertures 42 and 44 are formed in the pot-shaped member 38 at the outer periphery of the protruding inner end thereof. The suction aperture 42 is positioned adjacent to the valve seat 28 and directed to the downstream end of the intake port 20 surrounded by the valve seat insert 26, whereas the discharge aperture 44 is positioned on the side of the pot-shaped member 38 adjacent to the upper surface of the piston 16 and directed to the upper surface thereof.

The suction and discharge apertures 42 and 44 are more specifically described with reference to FIGS. 3 and 4. These apertures are formed of substantially circular openings formed in the pot-shaped member 38. A part of the suction aperture 42 which is nearest to the valve-seat insert 26 is indicated by 42'. This part 42' of the suction aperture 42 is substantially smoothly and continuously connected by a part 15' of the lower surface 15 of the cylinder head 14 to the valve seat 28. A part of the valve seat 28 nearest to the suction aperture 42 is indicated by 29. The suction aperture 42 is dimensioned such that a part 42" of the suction aperture 42 which is positioned in diametrically opposite relationship with the part 42' is positioned substantially continuous with the back face of the valve head 34 of the intake valve 30 when it is in its open position.

The positioning of the pot-shaped member 38 with respect to the cylinder head 14 is not limited to the embodiment shown. The pot-shaped member 38 may be positioned such that the part 42' of the suction aperture 42 is directly continuous with the part 29 of the valve seat 28. In this case, the surface areas extending from the part 29 of the valve seat 28 to the part 42' of the aperture 42 should be smoothly continuous.

Preferably, the inner peripheral surface 21 of the intake port 20 adjacent to the downstream end thereof is smoothly continuous with the inner peripheral surface of the valve-seat insert 26. This, however, does not necessarily mean that any discontinuity is not permissible at all. For example, in a four-cylinder in-line engine of the structure described above (total piston displacement: 1968 cc, diameter of cylinder bore 13: 88.5 mm, stroke of piston 16: 80.0 mm, compression ratio: 8.3, inner diameter of valve insert 26: 40 mm, diameter of suction aperture 42: 7.5 mm, diameter of discharge aperture 44: 6.5 mm and with a wedge-shaped main combustion chamber), a step of from 0.2 to 0.4 mm between the inner surface 21 and the inner surface of the valve-seat insert 26 does not provide any appreciable disadvantage for the engine performance. Further details will be discussed later.

A partition 37 is provided in the trap chamber 36 and extends axially thereof from the inner surface of the hemispherical end of the pot-shaped member 38 toward the plug electrodes 56 a distance which is substantially equal to one half of the axial dimension of the pot-shaped member 38. The partition 37 is secured to the hemispherical end of the pot-shaped member 38 by a suitable manner such as welding and divides the interior thereof into a first part communicated with the suction aperture 42, a second part communicated with the discharge aperture 44 and a third part to which the plug electrodes 56 are exposed and which interconnects the first and second parts.

A fuel injection nozzle 60 extends through a part of the intake manifold 22 and a part of the cylinder head 14 adjacent to the intake manifold 22 into the intake port 20. The nozzle 60 has an externally threaded portion 62 which is in threadable engagement with the part of the intake manifold 22 adjacent to the cylinder head 14 to rigidly mount the nozzle 60 on the engine 10. The nozzle 60 is designed to discharge a liquid fuel continuously throughout all of the strokes of each cycle of engine operation. For this purpose, the nozzle 60 is connected by a conduit 64 to means for continuously supplying the fuel to the nozzle, as will be described later. In the illustrated embodiment of the invention, the fuel injection nozzle 60 has a discharge orifice 61 which is positioned in the intake port such that a straight line extending between the discharge orifice 61 of the nozzle 60 and the above-mentioned part 29 of the valve seat 28 is included within a jet formed by the fuel discharged by the nozzle 60, the jet being shown by small dots in the drawings.

With reference to FIG. 5, the means for continuously supplying the fuel to respective nozzles 60 comprises a fuel pump 66 which is operative to pump up the liquid fuel from a fuel tank 68 to a fuel metering device 70 which includes a housing 72 defining therein a float chamber 74 which is connected to the fuel pump 66 by a pipeline 67. A float member 76 is provided in the float chamber 74 and has a valve 78 operative to control the flow of the fuel from the pump 66 into the chamber 74 so that the liquid level in the chamber is kept substantially constant. A pressure regulating chamber 80 is provided within the housing 72 and connected to the float chamber 76 by a pipeline 82 and a passage 84 extending through a wall portion of the housing 72. A gear pump 86 is provided in the pipeline 82 to feed the liquid fuel under pressure from the float chamber 76 to the pressure regulating chamber 80. The pressure regulating chamber 80 is defined by an open-topped recess 88 formed in the wall of the housing 72 and by a valve plate 90. A passage 92 extends from the bottom of the pressure regulating chamber 80 through the bottom wall of the housing 72 and is connected to a conduit 94 which in turn is connected to the conduits 64 extending from the respective fuel injection nozzles 60.

The valve plate 90 is designed to control the pressure within the pressure regulating chamber 80. For this purpose, the valve plate 90 is positioned to substantially cover the open top of the recess 88 and is movably supported by an arm 96 of a two-armed lever 98 which is pivotally mounted within the housing 72 as at 100. The other arm 102 of the lever 98 is connected by a rod 104 to a diaphragm 106 which cooperates with an inverted cup-shaped member 108 to define a vacuum chamber 110. A vent 112 is formed in the top of the housing 72.

The vacuum chamber 110 is connected by a pipeline 114 to a vacuum passage 116 formed in the throttle device 24. More specifically, the throttle device 24 comprises a throttle barrel 118 to which the intake manifold 22 is connected, as shown in FIG. 1. A throttle valve 120 is pivotally mounted within the throttle barrel 118 and operatively connected to an accelerator pedal (not shown) by an appropriate conventional mechanical connecting means (not shown) so that the flow of air through the barrel 118 into the engine is controlled. A venturi 122 is provided within the throttle varrel 118 upstream of the throttle valve 120. The vacuum passage 116 extends through the wall of the barrel 118 and is connected to the venturi 122 so that the vacuum produced therein is transmitted through the pipeline 114 to the vacuum chamber 110.

It will be appreciated that the diaphragm 106 is responsive to the variation in the vacuum produced in the venturi 122 to vary the position of the valve plate 90 with respect to the open top of the recess 88 so that the pressure in the pressure regulating chamber 80 is varied with a result that the rate of fluid supply to the respective fuel injection nozzles 60 is controlled such that the air-fuel ratio at which the fuel discharged from each fuel injection nozzle 60 to an engine cylinder is mixed with the air supplied through the associated intake port 20 is kept constant. This can be mathematically described as follows:

$$n \times Sa \times \Delta Pa = m \times Sf \times Pf \quad (1)$$

wherein "$\Delta Pa$" is the vacuum in the venturi 122, "$Pf$" is the fuel pressure within the pressure regulating chamber 80, "$Sa$" is the area of the diaphragm 106, "$Sf$" is the area of the valve plate 90 and "$m/n$" is the leverage of the arm 102 relative to the arm 96. Because $(n \cdot Sa)/(m \cdot Sf) = K$ (constant), the equation (1) can be rewritten $$Pf = K \cdot \Delta Pa \quad (2)$$

On the other hand, when the fuel pressure $Pf$ is substantially larger than the negative pressure in the intake port 20, a differential pressure $\Delta Pf$ therebetween can be considered as follows:

$$Pf \approx \Delta Pf \quad (3)$$

The amount of intake air "$Qa$" supplied to an internal combustion engine and the amount of injected fuel "$Qf$" are in the following relationships with respect to the venturi vacuum "$\Delta Pa$" and to the differential pressure "$\Delta Pf$", respectively:

$$Qa \propto \sqrt{\Delta Pa}$$

$$Qf \propto \sqrt{\Delta Pf}$$

Thus, the mean air-fuel ratio $a_T$ of the air-fuel mixture produced by the air and fuel is given by:

$$a_T = Qa/Qf \propto \sqrt{\Delta Pa/\Delta Pf} \quad (4)$$

The equations (2) and (3) are substituted into the equation (4) to give:

$$a_T = \text{constant}.$$

Thus, the fuel metering device described is operative to supply the fuel to each cylinder so that the air-fuel ratio therein is kept constant. So as to vary the air-fuel ratio, the leverage $m/n$ may be changed.

In order to vary the air-fuel ratio to comply with various operating conditions of the engine, a part of the venturi vacuum may be communicated with the atmosphere through a restriction. Alternatively, a plurality of vacuum delivery ports may be prepared so that selected vacuum delivery ports may be used in accordance with the engine operating conditions, such as the manifold vacuum or engine speed.

Figure 6A:
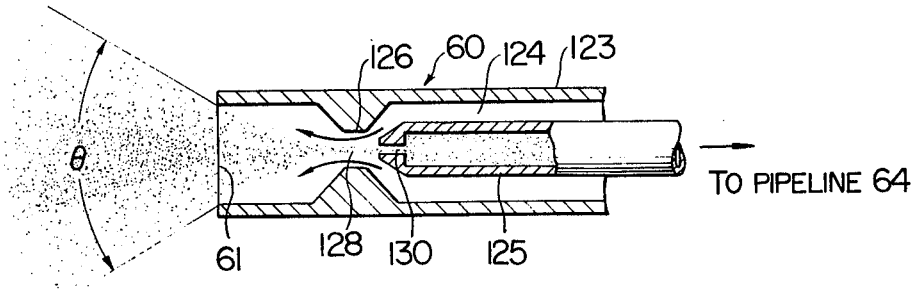
FIGS. 6A and 6B are partly diagrammatic, axial sectional views of fuel injection nozzles.

Referring to FIG. 6A, the fuel injection nozzle 60 comprises a pair of coaxial outer and inner tubes 123 and 125 which are radially spaced from each other to define an annular passage 124 therebetween. The inner tube 125 is connected at its upstream end to the pipeline 64 referred to previously. The outer tube 123 is provided therein with a fixed restriction 126 to provide a restricted orifice 128. The inner tube 125 is provided at its downstream end with a restricted orifice 130 disposed just upstream of the orifice 128. The upstream end of the annular passage 124 is communicated with a portion between the throttle valve 120 and the venturi 122. Alternatively, air under pressure may be supplied into the passage 124. In either case, air flows at an increased velocity through the restricted orifice 128 into which the fuel from the pipeline 64 is discharged from the inner tube 125 through the orifice 130. This arrangement facilitates the atomization of the discharged fuel.

The operation of the internal combustion engine described above will be described hereunder with reference to FIGS. 3, 7A and 7B. The fuel is continuously discharged into the intake port 20 from the fuel injection nozzle 60 through its discharge orifice 61 during the time when the engine is operated. The rate of the fuel discharge is controlled by the fuel metering device 70 described above. The part of the fuel discharged from the nozzle 60 into the intake port 20 during all strokes of each cycle of engine operation except the intake stroke is substantially equal to three quarters of the amount of the fuel to be fed into each engine cylinder during each cycle of engine operation (this "amount" of the fuel will be termed "a charge of fuel"

or the like). This part of the charge of fuel is retained in the intake port 20 during a period of time prior to the succeeding intake stroke and thus is effectively vaporized within the intake port due to the heat in this part of the engine. The vaporized fuel part is dispersed into the air fed from the intake manifold 22 into the intake port 20 and retained in the intake port 20 until the next succeeding suction stroke begins. On intake stroke of the engine, the vaporized fuel retained in the intake port 20 is introduced into the main combustion chamber 18 and the trap chamber 36 and further mixed with fresh air from the intake manifold 22 to form a lean air-fuel mixture. The rest of the charge of the fuel, which is substantially equal in amount to one-forth of a charge of fuel to be fed into each engine cylinder in each cycle of engine operation, is discharged during the intake stroke. Because the nozzle 60 is positioned such that the straight line extending between the nozzle discharge orifice 61 and the part 29 of the valve seat 28 is included within the jet of the fuel discharged from the nozzle, a part of the rest of the charge of fuel is effectively introduced into the trap chamber 36 through the suction aperture 42 thereof. More specifically, when the intake valve 30 is opened, the lean mixture of air and fuel produced in the intake port 20 flows into the cylinder bore 13, forming streams which are diagrammatically shown by arrows E and F. The streams E enter the main combustion chamber 18, whereas the stream F flows over the part 29 of the valve seat 28 and through the suction aperture 42 into the trap chamber 36. Since the injection nozzle 60 is positioned with respect to the art 29 of the valve seat 28 in the manner discussed above, a part of the rest of the fuel charge is suspended by the stream F and carried thereby into the trap chamber 36. It will be appreciated that the above-discussed positioning of the suction aperture 42 with respect to the back face of the valve head 34 when in its opened position is advantageous in that the stream F and thus the part of the rest of the fuel charge is guided by the back face of the valve head 34 toward the suction aperture 42. The partition 37 in the trap chamber 36 is operative to guide the stream F toward the electrodes 56 of the ignition plug 54 so that the residual gases produced in the trap chamber 36 during the preceding combustion stroke of the engine and retained in the trap chamber 36 are forced out of the trap chamber 36 through the discharge aperture 44, whereby the trap chamber is reliably scavenged. The remainder of the part of the fuel charge discharged in the intake stroke is introduced into the main combustion chamber to form a part of the lean air-fuel mixture therein.

As described above, a part of the lean air-fuel mixture produced by air and the part of the fuel charge discharged and vaporized during all the strokes of each cycle of engine operation except the intake stroke and a part of the rest of the fuel charge discharged during the intake stroke are introduced into the trap chamber 36 to produce therein a rich air-fuel mixture. It is to be noted that, of the whole of a charge of fuel required for each cycle of engine operation, only the part of the fuel charge required to produce the rich air-fuel mixture is fed into the engine in the intake stroke and the rest of the fuel charge is discharged during the other strokes of each cycle than the intake stroke. This is particularly advantageous in that the last-mentioned rest of fuel charge (discharged during the other strokes) can be appropriately vaporized in the intake port prior to the introduction into the main combustion chamber. It is also to be noted that the rich air-fuel mixture produced in the trap chamber includes a part of the fuel which has been vaporized within the intake port, whereby the ignitability of the rich air-fuel mixture within the trap chamber is greatly improved. The compression, combustion and exhaust strokes of the engine according to the present invention are substantially similar to those of the engine disclosed in the applicants' copending earlier application referred to above with the exception that in the engine of the present invention, the fuel is continuously discharged from the fuel injection nozzle into the intake port during these strokes of engine operation.

Figure 7A:
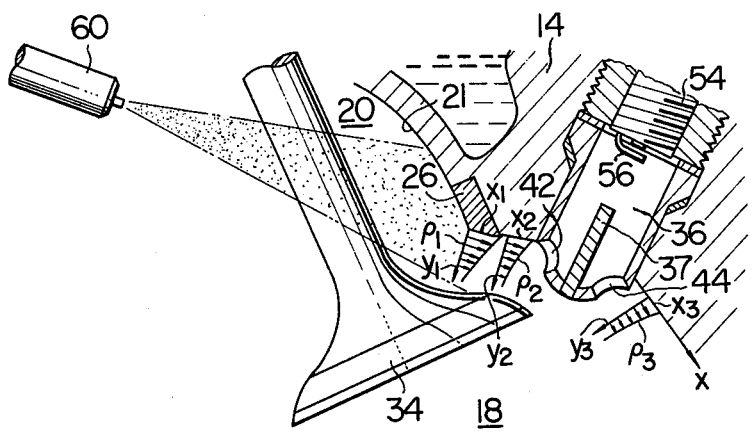
FIG. 7A is a fragmentary, partly sectional diagrammatic illustration of the operation of the engine shown in FIGS. 1 to 6B.
Figure 7B:
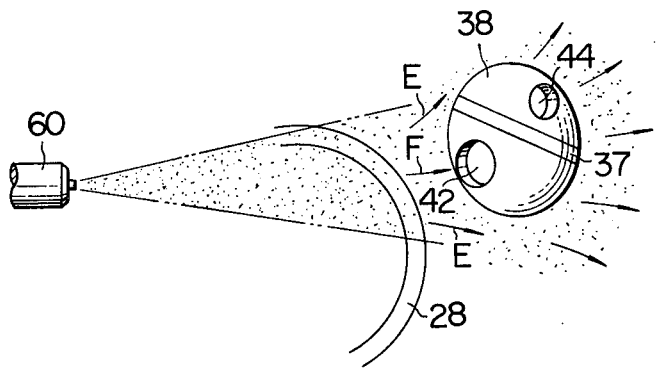
FIG. 7B is a fragmentary diagrammatic illustration as viewed from an arrow VIIB in FIG. 7A.

FIG. 7A includes a graphical illustration of the distribution of the richness of the rich air-fuel mixture caused by the fuel discharged during the intake stroke at points $x_1$, $x_2$ and $x_3$ along the path of the flow of the mixture across the lower surface 15 of the cylinder head 14. The path of the flow of the rich mixture is represented by $x$, the distance from each of the points $x_1$, $x_2$ and $x_3$ along the path x generally toward the center of the main combustion chamber 18 is represented by $y$, and the richness of the rich air-fuel mixture at various distances from the surface 15 at these points $x_1$ to $x_3$ is shown by short or small arrows. Thus, groups of small arrows at these points indicate the distribution of richness $\rho_1$ to $\rho_3$ of the rich air-fuel mixture. It will be seen in FIG. 7A that, as the rich air-fuel mixture flows downwardly, the mixture is distributed gradually uniform while the richness of the mixture is maximum on the surface 15 (namely, $y = 0$) at each of the points $x_1$ to $x_3$. It is also noted that the mixture is not diluted too much at the point $x_2$ which is just upstream of the suction aperture 42 of the trap chamber 26. These facts will mean that a large amount of especially rich air-fuel mixture can be introduced into the trap chamber in the case where the suction aperture 42 is disposed nearest to the valve seat 28 and a part of the peripheral edge of the aperture 42 is positioned to the lower surface 15 of the cyliner head 14.

The orientation of the fuel injection nozzle 60 and the smoothness of the surface area extending from the downstream end portion of the intake port 20 to the suction aperture 42 of the trap chamber 36 are very important to the above-discussed operation of the engine. If the direction of the jet of the fuel discharged from the nozzle is offset toward the axis of the valve seat 28 from the straight line between the nozzle discharge orifice 61 and the part 29 of the valve seat 28, the rich air-fuel mixture cannot be formed at the part 29 with the result that a lean mixture flows from the part 29 through the suction aperture 42 into the trap chamber 36. On the other hand, if the direction of the jet is offset from the straight line toward the side of the inner peripheral surface of the intake port 20 adjacent to the trap chamber 36, a substantial part of the fuel discharged during the intake stroke flows in liquid state on the inner peripheral surface of the intake port 20 and a part of the inner surface of the main combustion chamber with the resultant problem which has already been described herein.

The smoothness of the surface area from the downstream end of the intake port 20 to the suction aperture 42 should be to an extent where a turbulence (or disturbance) is hardly produced in the flow of the air-fuel mixture toward the suction aperture 42. More specifically, assuming that a step exists in the surface area, the height $h$ (dimension of the step measured from the surface area to the top thereof) should preferably be in the floowing relationship with respect to the diameter $D$ of the suction aperture 42:

$$h/D \leq 0.1$$

In other words, any step or projection of a height which falls within the range given by this equation will not cause any appreciable adverse effect on the introduction of the rich air-fuel mixture into the trap chamber 36 through the suction aperture 42.

FIG. 8 graphically illustrates the results of tests concerning the relationship between $\lambda f$ (ratio of the amount of fuel discharged during the intake stroke relative to the total amount of fuel charge discharged during each cycle of engine operation) and the output torque and between $\lambda f$ and the emission of HC. A torch ignition engine of the type to which the engine of the invention belongs was operated at a speed of 1200 r.p.m., with manifold vacuum of $-420$ mmHg and with the supply of air and fuel at mean air-fuel ratio (ratio of the total of lean and rich-fuel mixtures) of 20. The fuel was discontinuously discharged from fuel injection nozzles because the test by the continuous discharge of the fuel is limited almost to $\lambda f = 25\%$. As will be seen in FIG. 8, when the engine was operated with $\lambda f$ of from 20 to 50%, the emission of HC was effectively reduced without any appreciable drop of the engine output. Particularly, the emission of HC ws minimum at the $\lambda f$ of about 25%. This value of $\lambda f$ is substantially equal to the ratio of the amount of fuel discharged in the intake stroke of the engine according to the present invention relative to the total of a charge of fuel to be supplied to the engine in each cycle of the engine operation.

FIG. 9 graphically illustrates the results of tests concerning the relationships between the fuel injection timing and the output torque and between the fuel injection timing and the emission of HC, wherein the "fuel injection timing" represents the timing when the fuel injection ceases. The period while the fuel was injected was 3.5 m seconds. A torch ignition internal combustion engine of the type to which the engine of the present invention belongs was operated at a speed of 1500 r.p.m., with manifold vacuum of $-280$ mmHg and with supply of air and fuel at mean airfuel ratio of 18. The fuel was intermittently discharged in such a manner that the whole of the fuel charge was discharged at various timing of a cycle of engine operation. It was observed that the maximum output was obtained when the fuel charge was fed into the engine in the intake stroke. The reason will be that, with this injection timing, an appropriate rich air-fuel mixture was introduced into a trap chamber of the engine. However, this injection timing resulted in surprising increase in the emission of HC. Particularly, the HC emission was maximum when the fuel charge was injected at the final stage of the intake stroke. The reason for this will be that, with this injection timing, there was insufficient period of time for the fuel charge to be properly atomized.

Because the tests discussed with reference to FIG. 8 were conducted in such a manner that fuel was discontinuously discharged from nozzles, further tests were conducted on the torch ignition internal combustion engine according to the present invention in which the fuel was continuously discharged from nozzles 60 into the intake ports 20 in the manner described previously (Thus the ratio $\lambda f$ was substantially 25%). The tests were concerned with the relationship between mean air-fuel ratio $a_T$ and the output torque, emission of HC and emission of CO. For the purpose of comparison, similar tests were conducted on a prior art torch ignition internal combustion engine. In the prior art engine, the fuel was intermittently discharged from nozzles into intake ports in such a manner that the whole of a charge of fuel to be supplied in each cycle of engine operation was discharged in the intake stroke only (Thus $\lambda f$ was 100%). The results of the tests are shown in FIG. 10. It will be noted that the engine according to the present invention in which the fuel was continuously injected is superior to the prior art engine in respect of all of the output torque and HC and CO emissions. This will be because the fuel charges are more appropriately vaporized in the engine of the present invention than in the prior art engine.

Figure 6B:
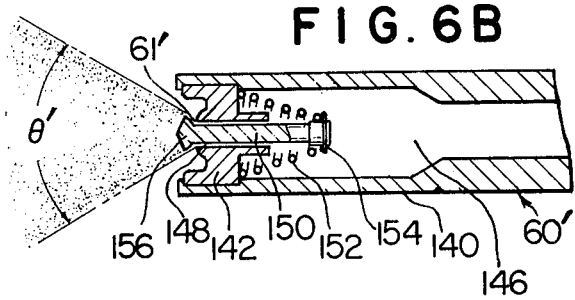

FIG. 6B illustrates a modification of the fuel injection nozzle 60 described above. The modified fuel injection nozzle is generally designated by 60' and comprises a tubular member 140 to be connected at its upstream end to the pipeline 64 discussed above. The downstream end of the tubular member 140 is substantially closed by a wall 142 so that a chamber 146 is defined in the tubular member 140. The wall 142 is formed therein with an axial orifice 148 through which a needle member 150 loosely extends axially slidably so that an annular fuel passage 148 is defined between the wall 142 and the needle member 150. A compression coil spring 152 is provided between the wall 142 and a spring retainer 154 provided on the inner end of the needle member 150 so that the needle member 150 is always biased inwardly by the spring 152. A generally hemispherical baffle 156 is secured to the outer end of the needle member 150. When pressure is exerted by the fuel to the needle member 150, the latter is outwardly moved so that an annular fuel discharge orifice 61' is defined between the baffle 156 and the peripheral edge of the fuel passage 148. The fuel flows from the chamber 146 through the fuel passage 148 and is discharged through the discharge orifice 61' into an intake port 20 of the engine.

Figure 11:
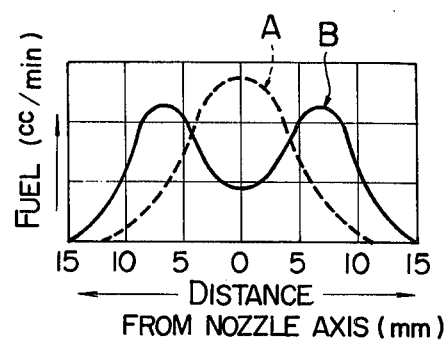
FIG. 11 graphically illustrates the operational characteristics of the nozzles shown in FIGS. 6A and 6B.

The fuel injection characteristics of the fuel injection nozzle 60' shown in FIG. 6B is illustrated in FIG. 11 by a curve B described by a solid line, while the fuel injection characteristics of the nozzle 60 shown in FIG. 6A is illustrated by a curve A described by a broken line. The two curves A and B respectively illustrate that the nozzle 60 discharges a larger amount of fuel in the central area of the cross-section of the jet of the discharged fuel than in the marginal area of the cross-section, while the nozzle 60' discharges a larger amount of fuel in the marginal area of the cros-section of fuel jet than in the central area of the cross-section. It is relatively easy to introduce a rich air-fuel mixture into the trap chamber 36 through the suction aperture 42 in the case where the fuel injection nozzle 60 shown in FIG. 6A is used in the engine 10 but, when the fuel injection nozzle 60' shown in FIG. 6B is used, widely spreaded fuel must be gathered toward the suction aperture 42 of the trap chamber 36.

Figure 12:
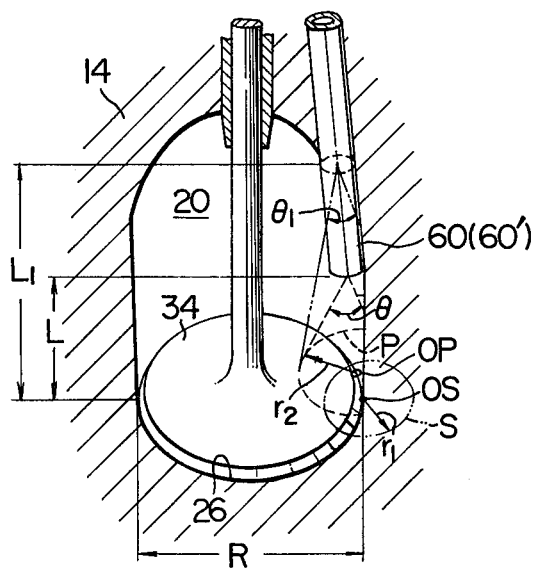
FIG. 12 is a diagrammatic illustration of the positioning of discharge orifices of fuel injection nozzles of various characteristics within an intake port.

In order that the trap chamber 36 may be supplied with a sufficient amount of the rich air-fuel mixture regardless of the fuel injection characteristics of a fuel injection nozzle used, the present invention locates the nozzles in a manner shown in FIG. 12. Namely, the nozzle 60 or 60' is positioned with respect to a cross-sectional area of the intake port 20 across the upper surface of the valve-seat insert 26 such that the center OP of a projection P of the jet of fuel from the fuel injection nozzle 60 or 60' on the cross-sectional area falls within a circular area S which has a radius $r_1$ equal to one-fifth of the diameter R of the crosssectional area of the intake port 20 and has a center OS located on the outer periphery of the intake port cross-sectional area nearest to the suction aperture 42 of the trap chamber 36 and such that the projection P of the jet has a radius $r_2$ which is smaller than the radius of the intake port cross-sectional area (R/2). So as to satisfy this requirement, an injection nozzle having an angle $\theta$ of fuel injection is mounted on the engine such that the fuel discharge orifice is positioned at a distance L from said cross-sectional area of the intake port 20, as shown by a solid line in FIG. 12, whereas an injection nozzle having a narrower angle $\theta_1$ of fuel injection is mounted such that the fuel discharge orifice is positioned at a larger distance $L_1$ from the intake port cross-sectional area as shown by a broken line in FIG. 12. When a fuel injection nozzle of any of the discussed types is positioned to satisfy the requirement discussed above, a substantial part of the jet of fuel injected from the nozzle is gathered at the part 29 of the valve seat 28 to assure that the trap chamber 36 is supplied with a sufficient amount of rich air-fuel mixture, whereby a stratified charge is attained in the engine according to the present invention with reliable purification of the engine exhaust gases.

Figure 13:
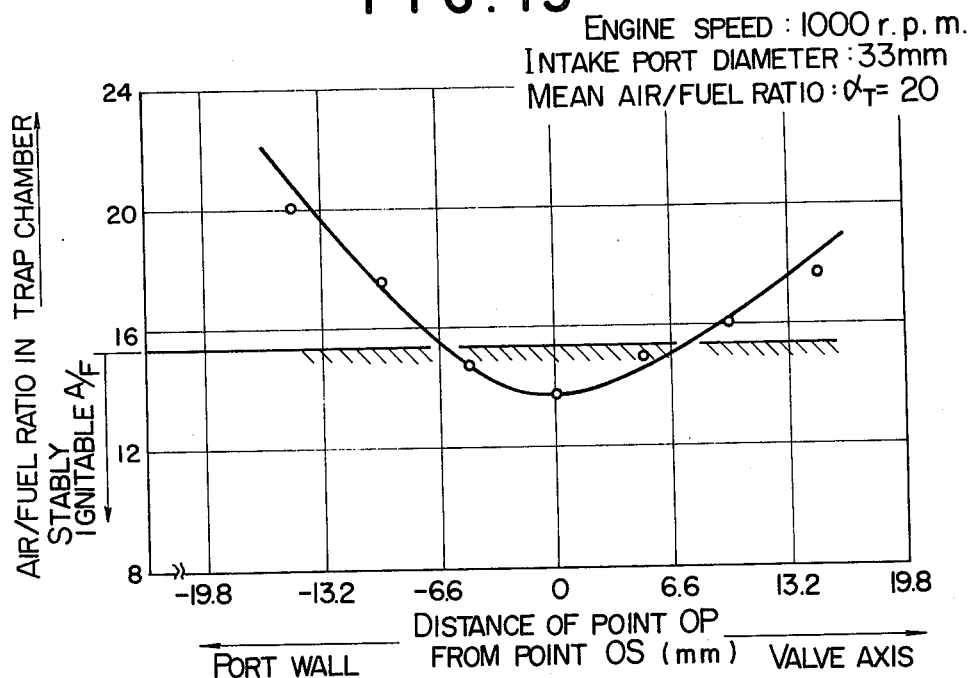
FIG. 13 is a graphical illustration of the result of tests concerning the relationship between the air-fuel ratio within an auxiliary combustion chamber and various positionings of a fuel injection nozzle within an intake port of the engine according to the present invention.
Figure 14:
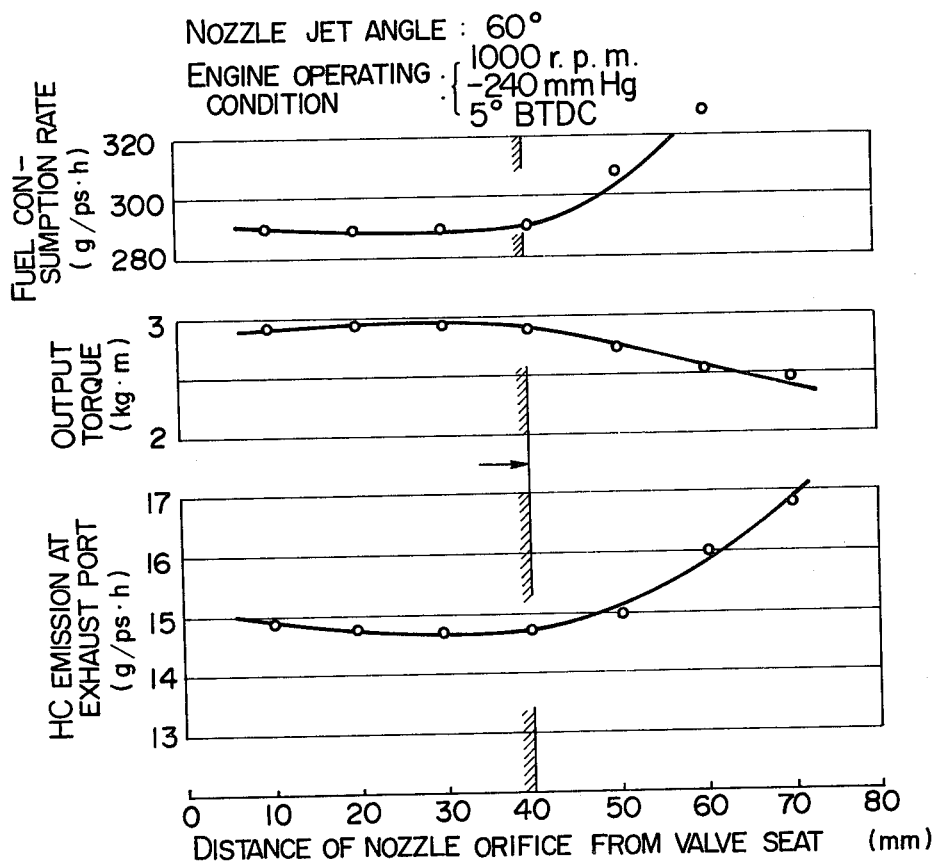
FIG. 14 graphically illustrates the results of tests on the relationships between various distances of a nozzle discharge orifice to a valve-seat insert and fuel consumption rate, between the nozzle distances and the output torque and between the nozzle distances and HC emission.

In order to ascertain the results of the positioning of the fuel injection nozzle described above, a test was conducted such that the center OP of the projection P of fuel jet was located at various positions with respect to the point OS (the point on the outer periphery of the intake port cross-sectional area nearest to the suction aperture 42 of the trap chamber 36) and the air-fuel ratio in the trap chamber was measured by means of a model test in which $CO_2$ gas was used. The diameter of the intake port cross-sectional area of the engine tested was 33 mm. The result of the test is shown in FIG. 13 in which "O" in the abscissa represents that the point OP was coincident with with the point OS. The minus values in the abscissa indicate the distances of the point OP from the point OS toward the wall of the intake port located near to the trap chamber, while the plus values are the distances of the point OP from the point OS toward the axis of the intake valve. It will be noted that the air-fuel ratio in the trap chamber was abruptly increased as the point OP is spaced from the point OS. The distance of 6.6 mm (equal to about one-fifth of the intake port diameter) of the point OP from the point OS was the boundary of the range within which the air-fuel ratio in the trap chamber was surely and stably ignitable by a spark plug. At the distances larger than the mentioned value, the air-fuel mixture introduced into the trap chamber 36 was not rich enough for the spark-ignition.

Further tests were conducted to ascertain the relationships between various distances L of the discharge orifice of a nozzle from a valve seat, fuel consumption rate, the output torque and emision of HC at an exhaust port. The nozzle used was of the type shown in FIG. 6B and discharged fuel at an angle of 60°. As the distance L was increased, the fuel consumption rate tended to increase. The torque was maximum at the nozzle distance ranging from about 20 to about 30 mm and was abruptly decreased as the nozzle distance exceeded about 40 mm. The emission of HC was greatly related to the exhaust gas temperature (not shown) and also tended to increase as the nozzle distance exceeded about 40 or 50 mm. Accordingly, it will be understood that the fuel injection nozzle should preferably be positioned such that the distance L between the discharge orifice of the nozzle and the valve seat ranges from 40 to 50 mm.

FIGS. 15 to 18B illustrate various modifications of the pot-shaped member 38, the modified pot-shaped members being designed by 38a through 38d in these drawings, respectively. The modified pot-shaped member 38a shown in FIG. 15 is provided with a suction aperture 42a formed of a slot and is mounted on the cylinder head 14 such that one of the longitudinal sides 42a' of the suction aperture 42a is located in the plane of the lower surface 15 of the cylinder head 14. This modification is advantageous in that a wider stream of the rich air-fuel mixture can be introduced through the slot 42a into the trap chamber with an increase in the charge effect of the rich air-fuel mixture. A discharge aperture 44a in the pot-shaped member 38a is circular as in the pot-shaped member 38 previously discussed.

The modified pot-shaped member 38b shown in FIG. 16 is provided with a circular suction aperture 42b of a diameter larger than that of the suction aperture 42 in the pot-shaped member 38 and is mounted on the cylinder head 14 such that an upper part of the circular suction aperture 42b is positioned within the cylinder head 14 so that the upper edge of the effective cross-section of the suction aperture 42b is provided by the surface portion 15' of the lower surface 15 of the cylinder head. This modification also provides an advantageous result similar to that provided by the suction aperture 42a shown in FIG. 15. A discharge aperture 44b in the pot-shaped member 38b is circular as in the pot-shaped member 38a shown in FIG. 15.

The pot-shaped member 38c shown in FIG. 17 is not provided with a partition but, instead, has a discharge aperture 44c of a circular section which is located in the member 38c near to the electrodes 56 of the ignition plug 54. The rich air-fuel mixture is introduced into a trap chamber 36c through a circular suction aperture 42c which is similar to the suction aperture 42 in the pot-shaped member 38 described. The rich air-fuel mixture flows in the trap chamber 36c toward the plug electrodes 56 so that residual combustion gases are discharged through the discharge aperture 44c. The cylinder head 14 is formed with a channel 15c which communicates the discharge aperture 44c with the main combustion chamber 18.

In the modified pot-shaped member 38d shown in FIGS. 18A and 18B, a portion of the peripheral wall of the member 38d adjacent to a suction aperture 42d, which itself is similar to the suction aperture 42 in the pot-shaped member 38, is bulged to form a ridge 37d in which a generally cylindrical passage 37' is formed to communicate the suction aperture 42d with the interior of the pot-shaped member 38d so that the rich air-fuel mixture is guided toward the plug electrodes 56. A discharge aperture 44d formed in the pot-shaped member 38d is similar to the discharge aperture 44 in the pot-shaped member 38.

Figure 20:
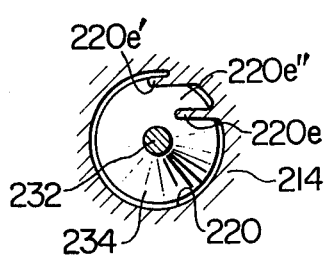
FIGS. 20 and 21 are sections taken along lines XX—XX and XXI—XXI in FIG. 19, respectively.
Figure 21:
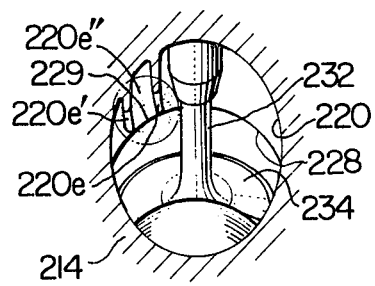

A second embodiment of the torch ignition internal combustion engine according to the present invention is shown in FIGS. 19 to 21 and generally designated by reference numeral 200. The parts of the second embodiment similar to those of the first embodiment shown in FIG. 1 are designated by similar reference numerals added with 200. In the second embodiment 200, a pair of substantially parallel fins 220e and 200e' are provided in an intake port 220 and extend axially of the intake port along that side of the inner peripheral surface of the intake port 220 which is generally aligned with a part 229 of a valve seat 228 adjacent to a suction aperture 242 of a trap chamber 236, as best seen in FIG. 19 or FIG. 21. The parallel fins 220e and 220e' extend inwardly from the mentioned side of the inner peripheral surface of the intake port 220 to cooperate with the mentioned part of the inner peripheral surface of the intake port to define a channel 220e'' which extends substantially to the downstream end of the intake port 220 and which is open toward the center of the cross-section of the intake port 220. A fuel injection nozzle 260 is positioned with respect to the intake port 220 such that a fuel discharge orifice 261 of the nozzle 260 is located just upstream of the upstream end of the channel 220e'' so that a part of the jet of fuel discharged from the nozzle 260 is received in the channel 220e''. Because this channel is separated in circumferential direction from the remaining part of the intake port cross-section, the part of the fuel discharged in an intake stroke and received in the channel 220e'' is guided by the fins 220e and 220e' and prevented from being disturbed by the circumferential flow of the air or the previously formed air-fuel mixture in the intake port 220 and flows through the channel 220e'' toward the suction aperture 242 of the trap chamber 236 while the fuel part is not diluted too much by the air in the intake port 220. Thus, this part of the fuel forms the rich air-fuel mixture to be received in the trap chamber 236. The rest of the fuel discharged in the intake stroke flows through the intake port 220 except the channel 220e'' into the main combustion chamber and form a part of the lean air-fuel mixture therein. The other parts of the operation of the engine 200 are substantially similar to those of the engine 10 and thus will not be described.

Figure 22:
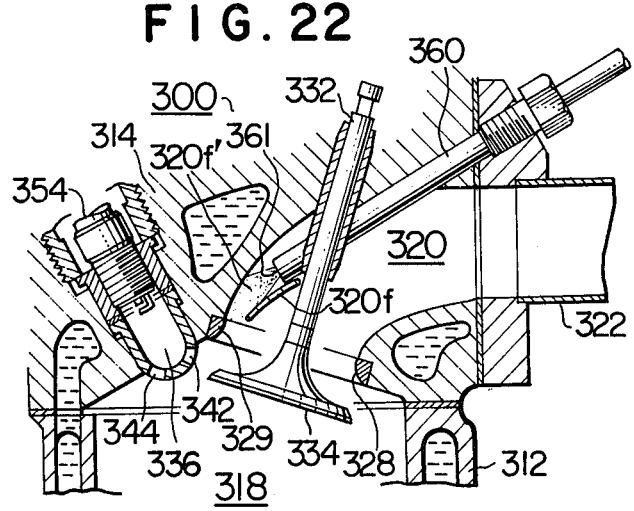
FIGS. 22 and 23 are fragmentary sectional views of third and fourth embodiments of the torch ignition internal combustion engine according to the present invention.
Figure 23:
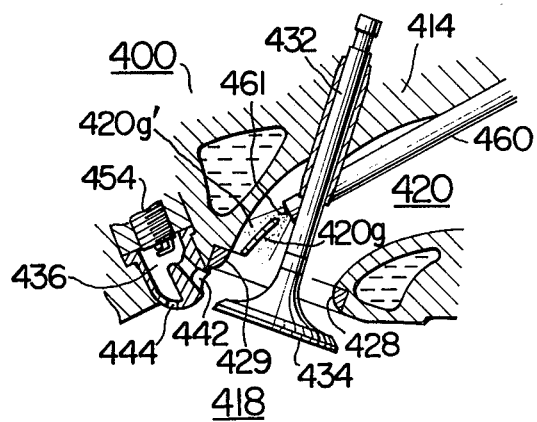

A third embodiment of the engine of the invention is shown in FIG. 22 and generally designated by 300. The parts of the engine 300 similar to those of the first embodiment shown in FIG. 1 are designated by similar reference numerals added with 300. A fourth embodiment is shown in FIG. 23 and generally indicated by 400. The parts of the embodiment 400 similar to those of the first embodiment shown in FIG. 1 are represented by similar reference numerals added with 400. In these embodiments 300 and 400, guiding plates 320f and 320g are provided in intake ports 320 and 420, respectively. Each of the guiding plates is so disposed as to divide the cross-sectional area of the associated intake port 320 or 420 into two sections one of which is adjacent to a part 329 or 429 of a valve seat 328 or 428 nearest to a suction aperture 342 or 442 of a trap chamber 336 or 436. The sides of the inner peripheral surfaces of the intake ports 320 and 420 which are aligned axially of the intake ports with the parts 329 and 429 respectively cooperate with the guiding plates 320f and 420g to define axial passages 320f' and 420g' which are separated from the remainders of the intake port cross-sections and which extend substantially to the downstream ends of the intake ports 320 and 420. In the embodiment in FIG. 22, a fuel injection nozzle 360 has its fuel discharge orifice 361 which is disposed within the axial passage 320f' adjacent to the upstream end thereof so that all of the fuel injected during the intake stroke flows through the passage 320f' toward the suction aperture 342 of the trap chamber for an improved introduction of the rich air-fuel mixture thereinto. In the embodiment in FIG. 23, a fuel injection nozzle 460 has its fuel discharge orifice 461 positioned in the intake port 420 just upstream of the upstream end of the guiding plate 420g so that the jet of fuel discharged from the nozzle 460 is divided into two streams one of which is received in the axial passage 420g' and flows toward the suction aperture 442 of the trap chamber 436.

It is also to be noted that, since each of the axial passages 320f' and 420g' in the third and fourth embodiments is separated in cross-section from each of the remainders of the intake ports 320 and 420, the fuel received in each of the axial passages 320f' and 420g' is prevented from being disturbed by the circumferential flow and the radially disturbed flow of the air or the previously formed air-fuel mixture in each of the intake ports 320 and 420, the rich air-fuel mixture formed in each of the axial passages 320f' and 420g' is surely directed toward each of the suction apertures 342 and 442.

It will be appreciated from the foregoing desciption that the embodiments described with reference to FIGS. 19 to 23 of the drawings are similar in function to the positioning of the fuel injection nozzle 60 or 60' which has been described with reference to FIG. 12.

What is claimed is:

1. A torch ignition internal combustion engine comprising a cylinder, a piston, a cylinder head cooperating with said cylinder and said piston to define a main combustion chamber for the combustion of a lean mixture of air and a fuel, an intake port connected at its upstream end to an air intake pipe and having a valve seat at the downstream end of said intake port, an intake valve movably positioned with respect to said valve seat, an auxiliary combustion chamber formed of a pot-shaped cavity having at least one suction aperture positioned near to said valve seat and at least one discharge aperture, said suction and discharge aperture being always communicated with said main combustion chamber during the time when said intake valve is closed, said suction aperture being adapted to be communicated with said intake port through a part of said main combustion chamber when said intake valve is opened, an ignition plug having a set of electrodes disposed in said pot-shaped cavity, a fuel injection nozzle having a discharge orifice disposed within said intake port upstream of said intake valve for discharging the fuel at a pressure higher than the atmospheric pressure, and means for continuously supplying the fuel to said fuel injection nozzle so that the fuel is continuously discharged from said discharge orifice into said intake port, said discharge orifice being positioned within said intake port such that an amount of the fuel discharged by said fuel injection nozzle during an intake stroke of each cycle of engine operation is moved through said intake port and through said part of said main combustion chamber toward said suction aperture of said pot-shaped cavity.

2. A torch ignition internal combustion engine according to claim 1, wherein said discharge orifice of said fuel injection nozzle is positioned in said intake port such that a jet of the fuel discharged from said fuel injection nozzle includes therein a straight line extending between said discharge orifice and a point of said valve seat adjacent to said suction aperture of said pot-shaped cavity.

3. A torch ignition internal combustion engine according to claim 2, wherein said valve seat is provided by a valve-seat insert, wherein said fuel injection nozzle is positioned with respect to a cross-sectional area of said intake port extending across said valveseat insert such that the center of projection of the jet of fuel from said fuel injection nozzle on said cross-sectional area of said intake port falls within a circular area having a radius equal to one-fifth of the diameter of said cross-sectional area of said intake port and having a center located on the outer periphery of said intake port cross-sectional area adjacent to said suction aperture of said pot-shaped cavity and wherein said projection of the jet has a radius which is smaller than a radius of said intake port cross-sectional area.

4. A torch ignition internal combustion engine according to claim 1, further including means disposed in said intake port and being cooperative with a part of the inner surface of said intake port to form a substantially separated axial passage which extends through a part of said intake port in the direction toward said auxiliary combustion chamber, and wherein said discharge orifice of said fuel injection nozzle is positioned within said intake port such that at least a part of the jet discharged from said nozzle is received in said separated passage.

5. A torch ignition internal combustion engine according to claim 4, wherein said cooperative means comprises a pair of axial fins extending inwardly from the inner surface of said intake port in substantially parallel relationship with each other, said fins being spaced a distance in the circumferential direction of said intake port and extending substantially to the downstream end of said intake port, said fins cooperating with the part of said intake port inner surface between said fins to define a channel which is open toward the center of the cross-section of said intake port.

6. A torch ignition internal combustion engine according to claim 4, wherein said cooperative means comprises a guiding plate so disposed in said intake port as to divide the cross-sectional area thereof into two sections one of which forms said separated passage, said guiding plate extending substantially to the downstream end of said intake port.

* * * * *